(12) United States Patent
Weber et al.

(10) Patent No.: US 10,844,754 B2
(45) Date of Patent: Nov. 24, 2020

(54) CAMSHAFT ADJUSTING SYSTEM HAVING A HYDRAULIC CAMSHAFT ADJUSTER AND AN ELECTRIC CAMSHAFT ADJUSTER

(71) Applicant: Schaeffler Technologies AG & Co. KG, Herzogenaurach (DE)

(72) Inventors: Jürgen Weber, Erlangen (DE); Jochen Thielen, Nuremberg (DE); Marco Hildebrand, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/393,994

(22) Filed: Apr. 25, 2019

(65) Prior Publication Data
US 2019/0353059 A1    Nov. 21, 2019

(30) Foreign Application Priority Data

May 18, 2018    (DE) .......................... 10 2018 111 994

(51) Int. Cl.
| | | |
|---|---|---|
| *F01L 1/34* | (2006.01) | |
| *F16H 53/04* | (2006.01) | |
| *F01L 1/047* | (2006.01) | |
| *F01L 1/344* | (2006.01) | |
| *F01L 1/053* | (2006.01) | |

(52) U.S. Cl.
CPC ................. *F01L 1/34* (2013.01); *F01L 1/047* (2013.01); *F16H 53/04* (2013.01); *F01L 2001/0537* (2013.01); *F01L 2001/34423* (2013.01)

(58) Field of Classification Search
CPC ......... F01L 1/047; F01L 1/3442; F01L 1/352; F01L 1/34; F01L 2001/3521; F01L 2001/0537; F01L 2001/0473; F01L 2001/34423; F01L 2001/34493;
(Continued)

(56) References Cited

U.S. PATENT DOCUMENTS

| | | |
|---|---|---|
| 9,080,474 B2 | 7/2015 | Wigsten et al. |
| 9,284,861 B2 | 3/2016 | Wigsten et al. |

(Continued)

FOREIGN PATENT DOCUMENTS

| | | |
|---|---|---|
| DE | 102009041755 A1 | 4/2010 |
| DE | 102011086236 B4 | 5/2013 |

(Continued)

OTHER PUBLICATIONS

Abstract of DE-102015207104-A1 (Oct. 2016).*

*Primary Examiner* — Zelalem Eshete
(74) *Attorney, Agent, or Firm* — Matthew Evans

(57) ABSTRACT

This disclosure relates to a camshaft adjusting system for a motor vehicle, having an inner camshaft, and an outer camshaft, which is arranged coaxially with and radially outside the inner camshaft. The camshaft adjusting system further includes an input wheel, which is designed to introduce torque into the camshafts, a hydraulic camshaft adjuster, which acts on the outer camshaft to adjust the phase angle of the outer camshaft relative to the input wheel, and an electric camshaft adjuster, which acts on the inner camshaft to adjust the phase angle of the inner camshaft relative to the input wheel. The electric camshaft adjuster engages in the hydraulic camshaft adjuster at least partially in an axial direction.

19 Claims, 6 Drawing Sheets

(58) Field of Classification Search
CPC ......... F01L 2001/34469; F01L 2250/04; F01L 2820/032; F01L 2250/02; F16H 53/04
See application file for complete search history.

(56) References Cited

U.S. PATENT DOCUMENTS 9,366,159 B2    6/2016  Wigsten et al.
2013/0284134 A1   10/2013  Methley

FOREIGN PATENT DOCUMENTS

| | | | |
|---|---|---|---|
| DE | 102014213937 A1 | | 1/2016 |
| DE | 102012105284 B4 | | 9/2016 |
| DE | 102015203894 A1 | | 9/2016 |
| DE | 102015203895 A1 | | 9/2016 |
| DE | 102015205272 A1 | | 9/2016 |
| DE | 102015207104 A1 | * | 10/2016 ............ F01L 1/3442 |
| DE | 102015006234 A1 | | 11/2016 |
| DE | 102015007956 A1 | | 12/2016 |
| DE | 102015216868 A1 | | 3/2017 |
| DE | 102017114069 A1 | | 5/2018 |
| EP | 3141711 A1 | | 3/2017 |
| WO | 2013053421 A1 | | 4/2013 |

\* cited by examiner

CAMSHAFT ADJUSTING SYSTEM HAVING A HYDRAULIC CAMSHAFT ADJUSTER AND AN ELECTRIC CAMSHAFT ADJUSTER

CROSS-REFERENCE TO RELATED APPLICATIONS

This application claims priority under 35 U.S.C. Section 119 to German Patent Application No. DE 10 2018 111 994.1 filed May 18, 2018, the entire disclosure of which is incorporated herein by reference.

TECHNICAL FIELD

This disclosure relates to a camshaft adjusting system for a motor vehicle, having an inner camshaft, an outer camshaft, which is arranged coaxially with and radially outside the inner camshaft, an input wheel, which is designed to introduce torque into the camshafts, a hydraulic camshaft adjuster, in particular of the rotary vane type, which acts on the outer camshaft to adjust the phase angle of the outer camshaft relative to the input wheel, and having an electric camshaft adjuster, which acts on the inner camshaft to adjust the phase angle of the inner camshaft relative to the input wheel.

BACKGROUND

Camshaft adjusting systems for adjusting two camshafts are already known from the prior art. WO 2013/053 421 A1, inter alia, discloses a valve train for an internal combustion engine having at least two camshafts and a phase adjuster, wherein the phase adjuster comprises an input wheel, a first actuator, which is connected to a first one of the camshafts, and a second actuator, which is connected to a second one of the camshafts, wherein a phase angle of the respective camshaft relative to the input wheel can be adjusted by adjusting the first and/or the second actuator, wherein the adjustment of the second actuator takes place in accordance with the adjustment of the first actuator. However, the disadvantage with this is that the two camshafts cannot be adjusted in a manner fully independent of each other but that there is a direct dependence between the positions of the camshafts.

To improve this, camshaft adjusting systems having an inner camshaft, an outer camshaft and two camshaft adjusters are also already known. DE 10 2009 041 755 A1, for example, discloses an adjuster construction of a dual independent adjusting system (DIPS) for coaxial camshafts, comprising a first and a second adjuster substructure, each comprising a rotor with outward-oriented vanes, a stator with inward-oriented projections, wherein each of the vanes extends between one pair of the inward-oriented projections so as to define chambers for pressurized hydraulic fluid in order to advance or retard the rotor in relation to the stator, and a front and rear cover, which define the front and rear wall of the chambers, wherein the rotors are suitable for connection to an inner camshaft and an outer camshaft, respectively; a chain sprocket or a belt pulley which is connected to the stator of one of the adjuster substructures, wherein the chain sprocket or the belt pulley is designed to transmit radial loads into the outer camshaft; and wherein the first and the second adjuster substructure are preassembled jointly to form a unit. However, the disadvantage with this is that the two camshafts are each actuated by a hydraulic camshaft adjuster. Since hydraulic adjustment is relatively slow, especially in a low temperature range of below −10° C., it cannot adequately meet the demands placed on it.

Camshaft adjusting systems having two coaxial camshafts are also already known, wherein an inner camshaft is adjusted by an electric camshaft adjuster and an outer camshaft is adjusted by a hydraulic camshaft adjuster in order to ensure rapid adjustment of the inner camshaft. In this connection, EP 3 141 711 A1, for example, discloses a dual camshaft adjuster for an internal combustion engine, having a crankshaft and a valve train, which has a first and a second group of cams, wherein the phase of the cams in each group is adjustable relative to the phase of the crankshaft independently of the phase of the cams of the other group, wherein the dual camshaft adjuster has an electric first camshaft adjuster for acting on the first group of cams and a hydraulic second camshaft adjuster for acting on the second group of cams.

However, the prior art always has the disadvantage that the electric camshaft adjuster, in particular, requires an increased axial installation space in contrast to a hydraulic camshaft adjuster, and this is often not available with the installation space parameters specified. As a result, it is not possible to use the known camshaft adjusting systems where the installation space is greatly restricted.

SUMMARY

It is therefore the object of the disclosure to avoid or at least mitigate the disadvantages of the prior art. In particular, the intention is to make available a camshaft adjusting system which is designed to save installation space and is compact, which allows independent adjustment of the camshafts and which simultaneously ensures full functionality of both camshaft adjusters.

According to the disclosure, the object is achieved in the case of a device of the type in question by virtue of the fact that the electric camshaft adjuster engages in/projects into the hydraulic camshaft adjuster at least partially in the axial direction.

This has the advantage that, on the one hand, the entire camshaft adjusting system is of shorter construction, especially in the axial direction, and that furthermore the often unused installation space within a rotor of the hydraulic camshaft adjuster is used.

Advantageous embodiments are explained in greater detail below.

In an example embodiment, an output shaft connected for conjoint rotation to a rotor of an electric motor of the electric camshaft adjuster is coupled in a torque-transmitting manner by means of a coupling, possibly one which cannot be disengaged, to an output ring gear connected for conjoint rotation to the inner camshaft. It is thereby possible to implement torque transmission from the rotor of the electric motor to the inner camshaft for the adjustment of the phase angle relative to the crankshaft. Thus, adjustment of the inner camshaft independently of the adjustment of the outer camshaft is thereby made available.

In an example embodiment, the output ring gear is mounted/supported on a radial inner side of a rotor of the hydraulic camshaft adjuster. Thus, the inner camshaft is thereby mounted on the already aligned rotor, enabling the concentricity and centering of the inner camshaft to be improved.

Moreover, it is possible by means of the mounting of the output ring gear to supply oil from the inner camshaft to working chambers, e.g. the acceleration chambers/A chambers, which are formed in the radial direction between the rotor and the stator of the hydraulic camshaft adjuster. In an example embodiment, oil passages extending in the radial direction within the output ring gear are designed to connect a region radially inside the inner camshaft to working chambers formed between the stator and the rotor. The oil passages in the output ring gear correspond to an annular passage on a radially inner side of the rotor of the hydraulic camshaft adjuster. From the annular passage, the oil is carried to the working chambers through further radial oil passages in the rotor. It is also advantageous if working chambers, e.g. deceleration chambers/B chambers, are supplied with oil from the outer camshaft via radial oil passages in the rotor, e.g. in the rotor web.

In one embodiment, the coupling is connected in a torque-transmitting manner to the output ring gear by means of a collared sleeve which is elastically deformable, in particular in the radial direction, and which is attached in a fixed manner to the input wheel. By means of the elastically deformable design of the collared sleeve, it is possible to compensate a coaxiality of the inner camshaft. Thus, the coaxiality of the outer camshaft can therefore be compensated independently of or separately from the inner camshaft, enabling better centering to be achieved. Moreover, the improved coaxiality compensation makes it possible to correct a larger eccentricity of the inner camshaft.

Moreover, the coupling can be designed as an Oldham coupling/cross-slot coupling. This means that the coupling is designed as a torsionally rigid coupling which cannot be disengaged and which can compensate a radial offset between two parallel shafts. Thus, a radial elastic deformation of the collared sleeve is compensated by the coupling, ensuring that any eccentricity is not transmitted to the output shaft of the rotor of the electric camshaft adjuster. An Oldham coupling is known per se from the prior art, and therefore there is no further discussion of such a coupling at this point.

In one embodiment, the input wheel and/or the hydraulic camshaft adjuster are/is supported on the outer camshaft by means of a radial plain bearing assembly. This has the advantage that centering of the input wheel and/or of the hydraulic camshaft adjuster relative to the outer camshaft is thus ensured. This enables an inner camshaft, which is in turn supported on the hydraulic camshaft adjuster and/or the input wheel, to be aligned with respect to the outer camshaft with precise coaxiality. Coaxiality compensation between the two concentric camshafts which allows particularly smooth running of the two camshafts and precise actuation of a valve train is thus achieved. Moreover, the coaxiality compensation is neutral in terms of costs since there is no need for an additional coupling. Furthermore, it is thereby advantageously possible to maintain a required concentricity of a chain toothing of the input wheel with respect to the outer camshaft.

Moreover, it is expedient if the radial plain bearing is arranged on a radial outer side of a bearing hub connected in a fixed manner to the outer camshaft. This means therefore that the radial outer side of the bearing hub serves as a bearing surface for the hydraulic camshaft adjuster and/or the input wheel. In other words, the input wheel or an input wheel housing is mounted on the outer camshaft by means of an external radial bearing assembly. It is thereby possible, on the one hand, to use the installation space radially outside the outer shaft and, on the other hand, to ensure particularly precise centering between the input wheel or the input wheel housing or the hydraulic camshaft adjuster and the outer camshaft.

In particular, the bearing hub can be designed as a component separate from the outer camshaft. It is thereby advantageously possible to form the bearing surface on the radially outer side of the bearing hub with high accuracy without the need to machine an entire radial outer side of the outer camshaft. It is thereby possible to provide a low-cost, accurate bearing surface.

In one embodiment, the bearing hub is attached to the outer camshaft by means of a nonpositive joint, in particular by means of a press fit assembly. In this way, it is possible to produce an easily and inexpensively produced joint between the camshaft and the bearing hub.

In one embodiment, the bearing hub is connected for conjoint rotation to a rotor of the hydraulic camshaft adjuster, said rotor being rotatable relative to a stator.

It is furthermore expedient if the rotor of the hydraulic camshaft adjuster, said rotor being rotatable relative to the stator and connected for conjoint rotation to the outer camshaft, is centered relative to the input wheel by means of a compressible sealing element, possibly by means of a plurality of sealing elements distributed uniformly over the circumference of the rotor, and/or by means of an elastic rotor vane configuration. By means of the compressibility of the sealing elements, it is possible to compensate an eccentricity, and the rotor can be centered relative to the stator.

In an example embodiment, the sealing element is under spring preload in the radial direction. It is thereby possible to adjust or produce coaxiality by means of a spring preload.

Moreover, an example embodiment is distinguished by the fact that the rotor of the hydraulic camshaft adjuster is mounted in a floating manner in the axial direction, i.e. with axial play, on the outer camshaft. This advantageously avoids stresses arising between the rotor of the hydraulic camshaft adjuster and the outer camshaft due to an overdetermined bearing assembly.

In one embodiment, the rotor of the hydraulic camshaft adjuster is mounted on the outer camshaft by means of a sliding tooth system. It is thereby possible in a simple manner to achieve axial play between the outer camshaft and the rotor of the hydraulic camshaft adjuster and, at the same time, to ensure torque transmission via the tooth system in the circumferential direction.

It is particularly expedient if the sliding tooth system is formed by a rotor hub, possibly designed with internal teeth, which is connected in an axially fixed manner to the rotor, and by an intermediate hub, possibly that of an externally toothed design, which is connected in an axially fixed manner and for conjoint rotation to the outer camshaft.

It is furthermore expedient if the rotor hub is of one-piece design with the rotor or is formed separately from the rotor. The rotor hub can be mounted in an axially fixed manner on the rotor by means of a riveted joint, a press fit assembly, a sintered brazed joint, a pin joint and/or a screwed joint, for example.

In one embodiment, the rotor has a centering shoulder for the centered alignment of the rotor hub relative to the rotor. It is thereby possible to improve the coaxiality of the entire camshaft adjusting system.

The disclosure relates to an inexpensive design for coaxiality compensation between the two concentric camshafts in an electrohydraulic adjusting system having an electric camshaft adjuster and a hydraulic camshaft adjuster. This is achieved inter alia by means of external radial mounting of an input wheel housing or of a chain or belt sprocket on the outer camshaft. Moreover, floating radial mounting of the rotor in the input wheel housing or in the stator with radial decoupling of the rotor with respect to the outer camshaft is implemented by means of a hub with a toothed drive. In this context, coaxiality compensation takes place by way of sealing strips sprung by means of leaf springs or by way of the plug-in rotor vanes. Moreover, the inner camshaft with floating mounting relative to the input wheel is mounted in the electric camshaft adjuster with coaxiality compensation relative to the input wheel housing by means of the elasticity of the flexible collared sleeve. In addition, a radial runout of the inner camshaft can be reduced by radial mounting of the output ring gear of the electric camshaft adjuster in an inside diameter of the rotor of the hydraulic camshaft adjuster.

By means of this mounting of the output ring gear, the working chambers, in particular first subchambers, of the hydraulic camshaft adjuster can be supplied with the oil from the inner camshaft via radial oil passages in the output ring gear and via an annular passage on the inside diameter of the rotor and additional radial oil passages. The other working chambers, in particular the second subchambers, can be supplied with the oil from the outer shaft via radial passages in the rotor. A rotor hub with a toothed drive can be centered with respect to the rotor by means of a shoulder and can be connected to the rotor body by means of a riveted joint. The rotor hub can also be of one-piece or multi-piece design with the rotor body.

BRIEF DESCRIPTION OF THE DRAWINGS

The disclosure is explained below with the aid of drawings. In the drawings.

DETAILED DESCRIPTION

The figures are of a purely schematic nature and serve only to aid understanding of the disclosure. The same elements are denoted by the same reference signs. Features of the different illustrative embodiments can be interchanged.

Figure 1:
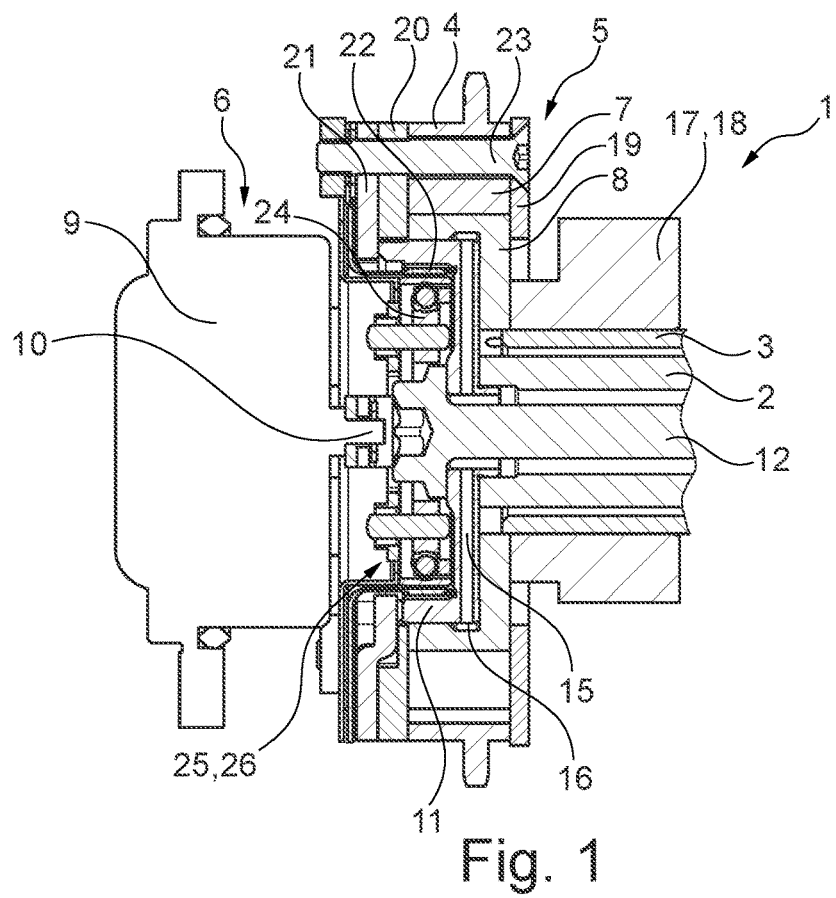
FIG. 1 shows a longitudinal section through a camshaft adjusting system according to a first embodiment.
Figure 2:
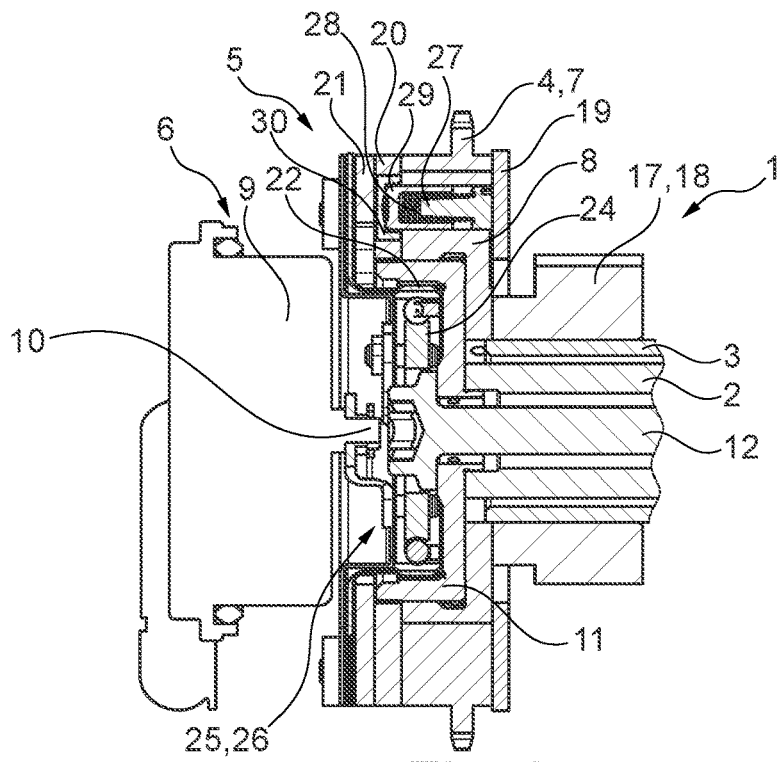
FIG. 2 shows a longitudinal section through the camshaft adjusting system rotated relative to that in FIG. 1.
Figure 3:
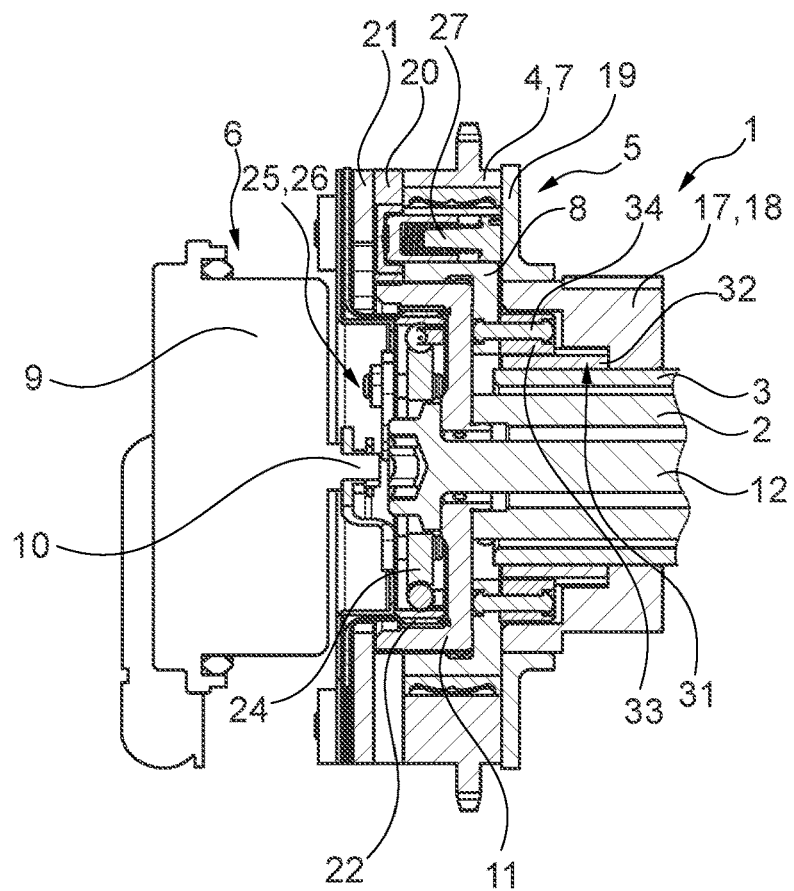
FIG. 3 shows a longitudinal section through the camshaft adjusting system in a second embodiment.
Figure 4:
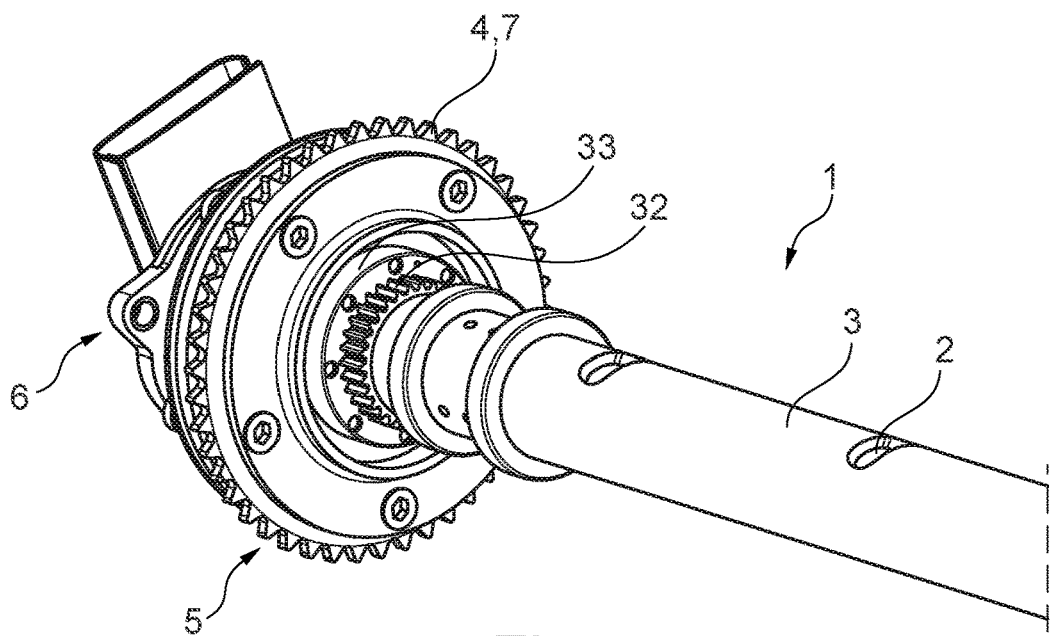
FIG. 4 shows a perspective illustration of the camshaft adjusting system in the second embodiment.
Figure 5:
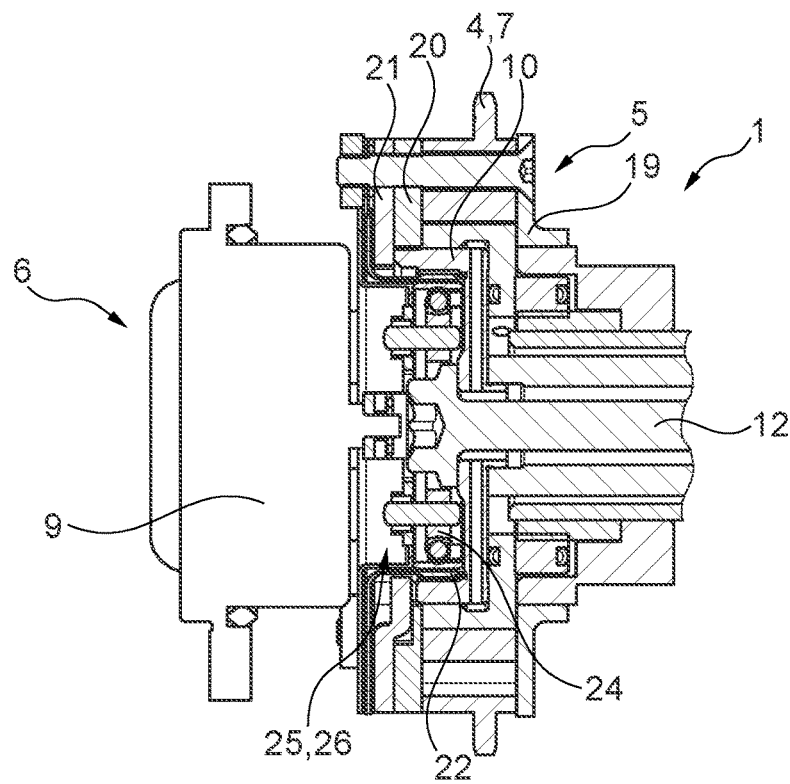
FIG. 5 shows a longitudinal section through the camshaft adjusting system rotated relative to that in FIG. 3.
Figure 6:
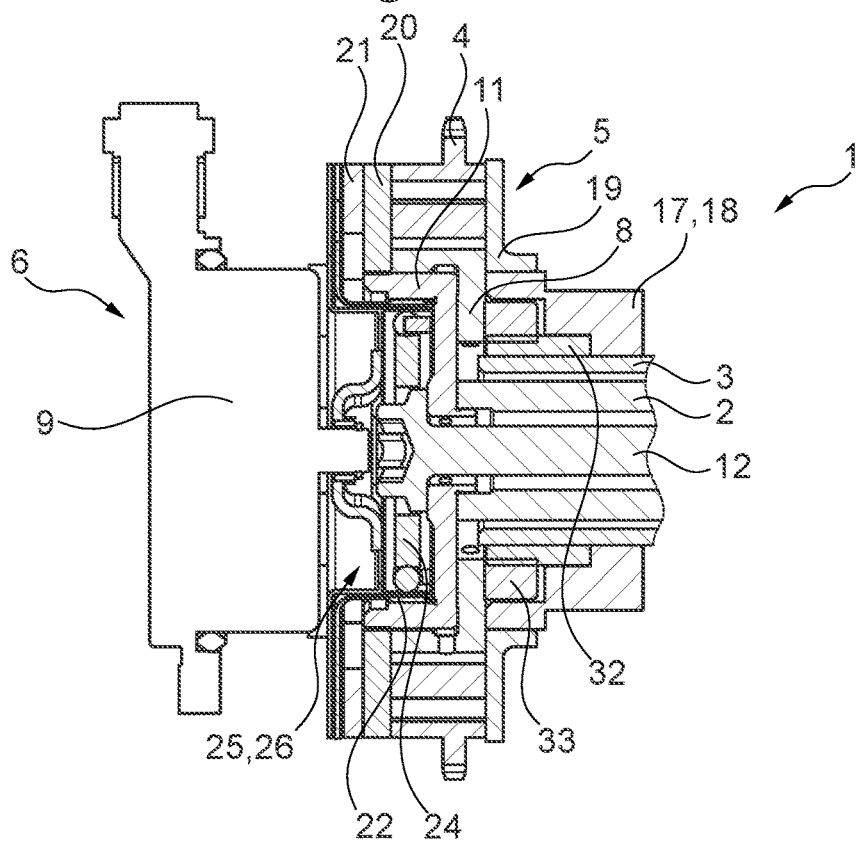
FIG. 6 shows a longitudinal section through the camshaft adjusting system rotated relative to that in FIG. 4, FIGS. 7 to 9 show perspective illustrations of the camshaft adjusting system with cams of an inner camshaft and of an outer camshaft.

FIGS. 1 and 2 show a camshaft adjusting system 1 according to the disclosure in a first illustrative embodiment. The camshaft adjusting system 1 has an inner camshaft 2 and an outer camshaft 3 arranged coaxially with respect to the latter. The outer camshaft 3 is arranged radially outside the inner camshaft 2. The camshaft adjusting system 1 also has an input wheel 4 designed as a chain sprocket, which is coupled to the camshafts 2, 3 for the introduction of torque.

The camshaft adjusting system 1 also has a hydraulic camshaft adjuster 5 of the rotary vane type, which is coupled to the outer camshaft 3. The hydraulic camshaft adjuster 5 acts on the outer camshaft 3 in order to adjust a phase angle of the outer camshaft 3 relative to the input wheel 4. The camshaft adjusting system 1 also has an electric camshaft adjuster 6, which is coupled to the inner camshaft 2. The electric camshaft adjuster 6 acts on the inner camshaft 2 in order to adjust a phase angle of the inner camshaft 2 relative to the input wheel 4.

The hydraulic camshaft adjuster 5 has a stator 7 and a rotor 8 arranged coaxially with respect to the latter. The rotor 8 is arranged radially inside the stator 7 and mounted in such a way as to be rotatable relative to the stator 7. The stator 7 is formed integrally with the input wheel 4. The electric camshaft adjuster 6 has an electric motor 9, which is not illustrated in detail in the figures but is only indicated schematically. An output shaft 10 connected for conjoint rotation to a rotor of the electric motor 9 is coupled in a torque-transmitting manner to an output ring gear 11. The output ring gear 11 is attached to the inner camshaft 2 by way of a central screw/a central valve 12.

The output shaft 10 is arranged in such a way that it engages/projects into the hydraulic camshaft adjuster 5 in the axial direction. That is to say that the output shaft 10 is arranged radially inside the rotor 8 of the hydraulic camshaft adjuster 5 and at least partially on the same axial level as the rotor 8. The rotor 8 has an annular rotor body 13 and a rotor web 14 extending perpendicularly to the axial direction.

The output ring gear 11 is mounted on a radial inner side/an inside diameter of the rotor 8, in particular of the rotor body 13. Oil passages 15, which extend in the radial direction and carry oil from a region within the inner camshaft 2 to the radial inner side of the rotor 8, are formed in the output ring gear 11. The oil passages 15 open into an encircling annular passage 16, which is formed on the radial inner side of the rotor 8. From there, additional oil passages extend to working chambers for adjusting the phase angle, which are formed between the rotor 8 and the stator 7.

A bearing hub 17 is connected for conjoint rotation and in an axially fixed manner to the outer camshaft 3. The bearing hub 17 serves as an external mounting 18 for the input wheel 4. The input wheel 4 is provided with radial sliding support on the bearing hub 17. For this purpose, a first cover 19, which is fixed with respect to the input wheel/fixed with respect to the stator and is arranged on one axial end of the stator 7, rests on the bearing hub 17. A second cover 20, which is fixed with respect to the input wheel/fixed with respect to the stator, is arranged on another axial end of the stator 7. The first cover 19, the stator 7, the second cover 20, a third cover 21, which rests on the second cover 20 in the axial direction on a side of the second cover 20 facing away from the stator, and a collared sleeve 22 are connected to one another for conjoint rotation and in an axially fixed manner by a screw 23.

The collared sleeve 22 has a section extending perpendicularly to the axial direction and a sleeve-shaped section. The sleeve-shaped section is situated radially inside the output ring gear 11 and has an external tooth system, which meshes with an internal tooth system on a radial inner side of the output ring gear 11. The collared sleeve 22 is elastically deformable in the radial direction. The torque is transmitted from the output shaft 10 to the collared sleeve 22 by a "harmonic drive" 24, i.e. a gear mechanism which has a flexible transmission element. A gear mechanism of this kind is already known from the prior art. A detailed description of the gear mechanism is therefore omitted.

The collared sleeve 22 is connected in a torque-transmitting manner to the output shaft 10 by means of a coupling 25. In this case, the coupling 25 is designed as an "Oldham coupling" 26, which can compensate a radial offset between two shafts coupled by the coupling. The concentricity of the output ring gear 11 is considerably improved by the elasticity of the collared sleeve 22 and the radial offset compensation of the coupling 25.

A central locking device 27 of the rotor 8 is additionally illustrated in FIG. 2. For this purpose, a locking pin 29 preloaded by a spring 28 is arranged in an axial recess in the rotor 8. If the axial recess is supplied with oil, the locking pin 29 is moved counter to the spring preload and locking for conjoint rotation between the stator 7 and the rotor 8 is unlocked. If the axial recess is not supplied with oil, the spring 28 pushes the locking pin 29 into a bushing 30, which is arranged in the second cover 20 fixed with respect to the stator.

FIGS. 3 to 16 show a second illustrative embodiment of the camshaft adjusting system 1. The second illustrative embodiment has all the features already described in connection with the first illustrative embodiment.

As shown in FIGS. 3 to 6, a sliding tooth system 31 is formed between the rotor 8 and the outer camshaft 3. The sliding tooth system 31 is formed by an intermediate hub 32, which is connected for conjoint rotation and in an axially fixed manner to the outer camshaft 3, and a rotor hub 33. The intermediate hub 32 has an external tooth system, which meshes with an internal tooth system of the rotor hub 33. The rotor hub 33 is connected in an axially fixed manner and for conjoint rotation to the rotor 8, in particular to the rotor web 14, by means of a riveted joint 34. Torque transmission between the outer camshaft 3 and the rotor 8 is thereby achieved, since axial floating mounting is provided.

Figure 7:
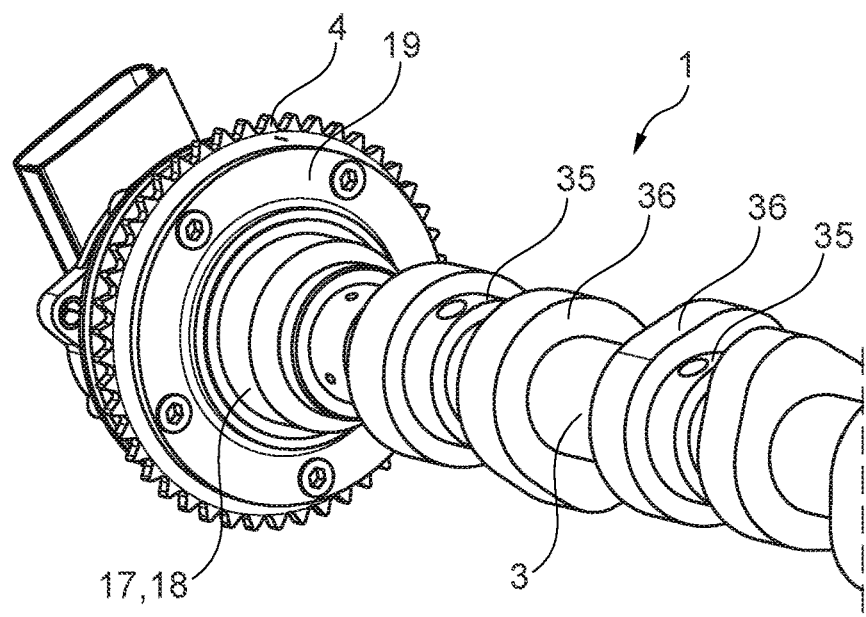
Figure 8:
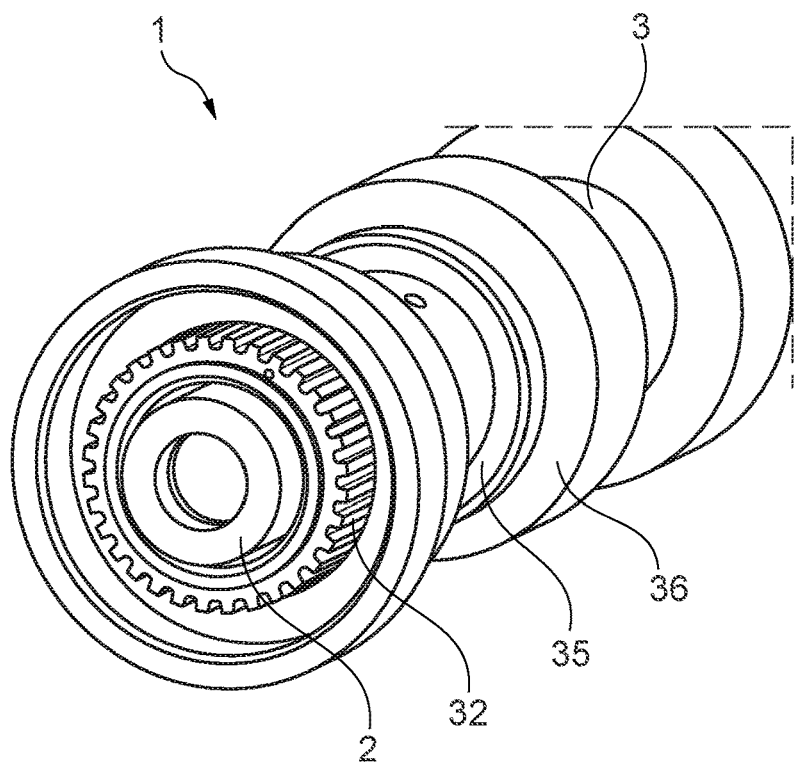
Figure 9:
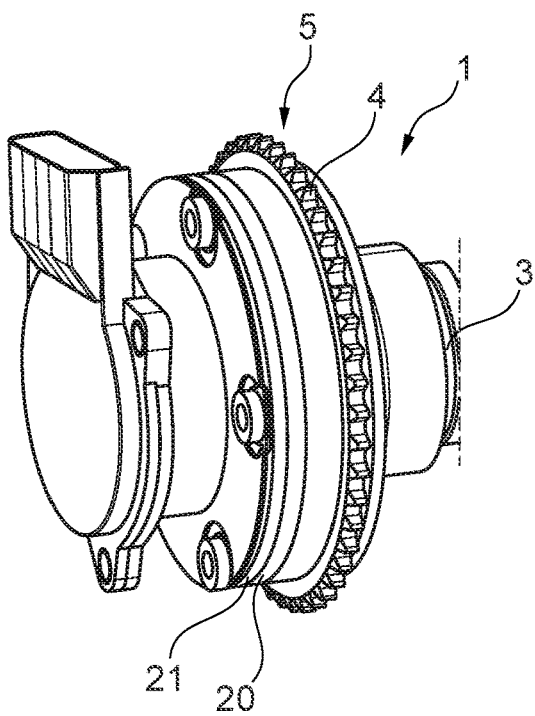

It can be seen in FIGS. 7 to 9 that the inner camshaft 2 has eccentrically formed cams 35 and the outer camshaft 3 has eccentrically formed cams 36. Here, the position of the cams 35, 36 is matched to a valve train.

Figure 10:
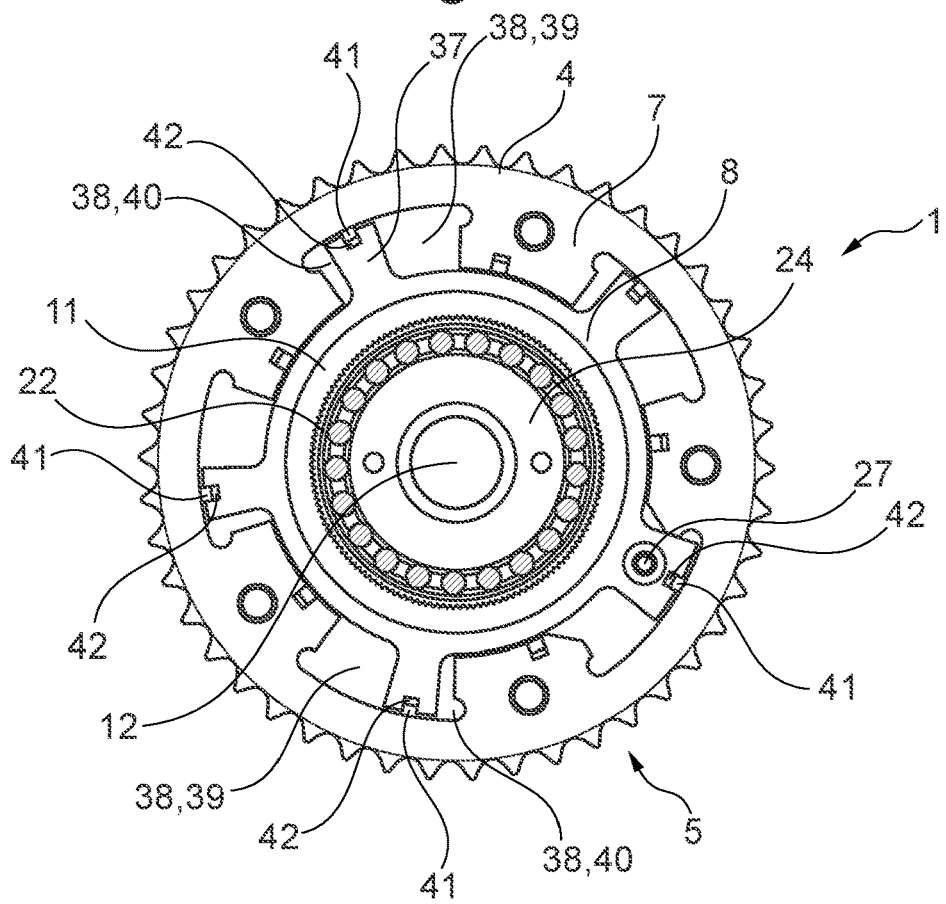
FIG. 10 shows a cross section through the camshaft adjusting system.
Figure 11:
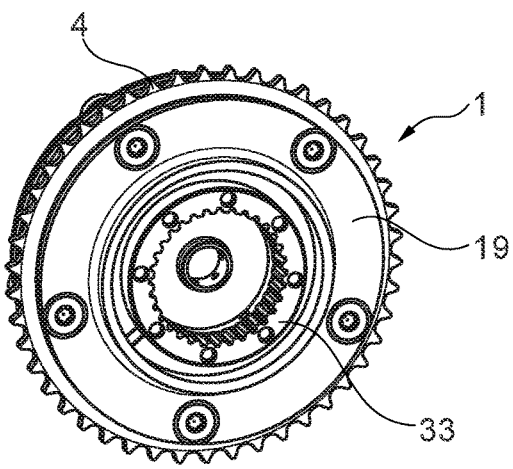
FIGS. 11 to 16 show perspective views of the camshaft adjusting system and of individual components thereof.
Figure 12:
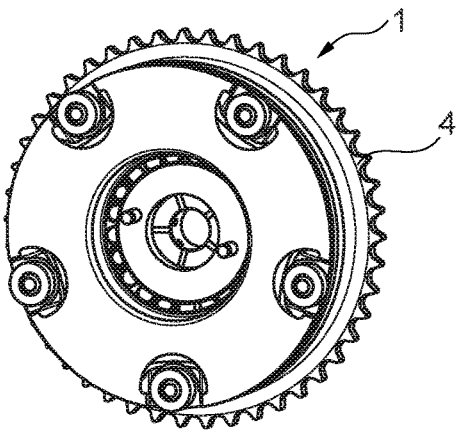
Figure 13:
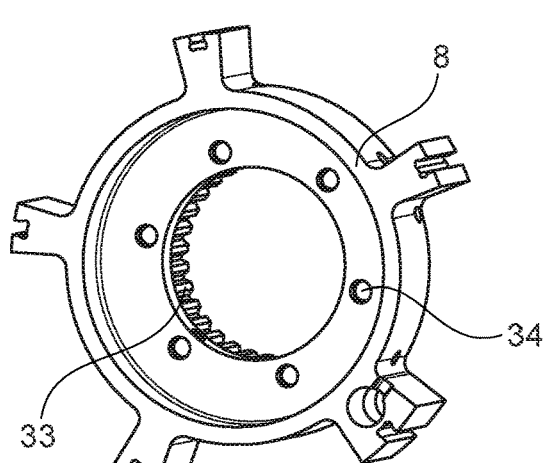
Figure 14:
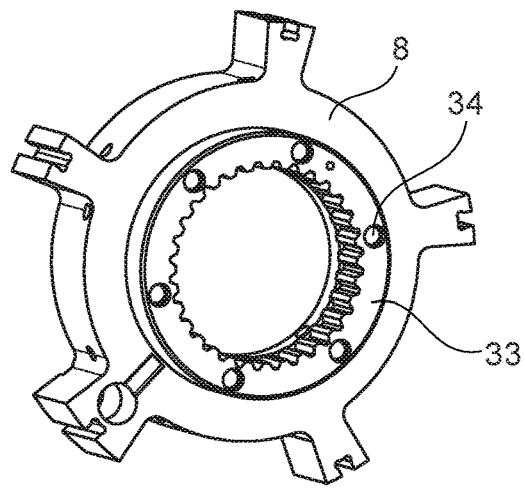
Figure 15:
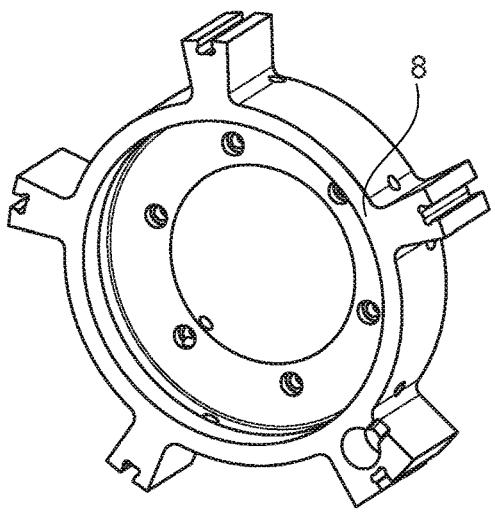
Figure 16:
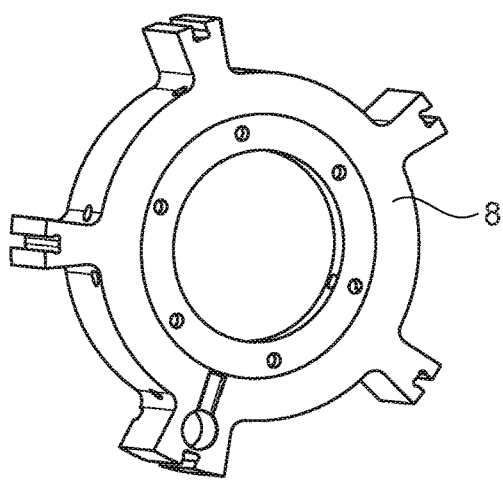

It can be seen in FIG. 10 that the rotor 8 has a plurality of vanes 37 distributed uniformly over the circumference. The vanes 37 each divide a working chamber 38 formed by an inner wall of the stator 7 and the rotor 8 into a first subchamber 39 and a second subchamber 40. To seal off the two subchambers 39, 40, a sealing element 41 is arranged on a radial outer side of the vanes 37. The sealing elements 41 are spring preloaded in the radial direction by a spring element 42.

FIGS. 11 to 16 show further illustrations of the rotor 8, the rotor hub 33 and the entire hydraulic camshaft adjuster 5.

LIST OF REFERENCE CHARACTERS 1 camshaft adjusting system
2 inner camshaft
3 outer camshaft
4 input wheel
5 hydraulic camshaft adjuster
6 electric camshaft adjuster
7 stator
8 rotor
9 electric motor
10 output shaft
11 output ring gear
12 central screw
13 rotor body
14 rotor web
15 oil passage
16 annular passage
17 bearing hub
18 external mounting
19 first cover
20 second cover
21 third cover
22 collared sleeve
23 screw
24 harmonic drive
25 coupling
26 Oldham coupling
27 central locking device
28 spring
29 locking pin
30 bushing
31 sliding tooth system
32 intermediate hub
33 rotor hub
34 riveted joint
35 cam
36 cam
37 vane
38 working chamber
39 first subchamber
40 second subchamber
41 sealing element
42 spring element

The invention claimed is:

1. A camshaft adjusting system for a motor vehicle, comprising:
    an inner camshaft;
    an outer camshaft arranged coaxially with and radially outside the inner camshaft;
    an input wheel configured to introduce torque into the camshafts;
    a hydraulic camshaft adjuster which acts on the outer camshaft to adjust a phase angle of the outer camshaft relative to the input wheel; and
    an electric camshaft adjuster which acts on the inner camshaft to adjust a phase angle of the inner camshaft relative to the input wheel, the electric camshaft adjuster comprising an electric motor having an output shaft and an output ring gear, the output shaft torque-transmittingly connected to the output ring gear, and the output ring gear connected for conjoint rotation to the inner camshaft; and
    the electric camshaft adjuster engages in the hydraulic camshaft adjuster at least partially in an axial direction.

2. The camshaft adjusting system as claimed in claim 1, wherein the output shaft is torque-transmittingly connected to the output ring gear by a coupling.

3. The camshaft adjusting system as claimed in claim 1, wherein the output ring gear is mounted on a radial inner side of a rotor of the hydraulic camshaft adjuster, the rotor being rotatable relative to a stator of the hydraulic camshaft adjuster.

4. The camshaft adjusting system as claimed in claim 3, wherein oil passages extending in a radial direction connect a region radially inside the inner camshaft to working chambers in the output ring gear, which are formed between the stator and the rotor.

5. The camshaft adjusting system of claim 3, wherein the output ring gear is rotatable relative to the rotor.

6. The camshaft adjusting system as claimed in claim 1, wherein the output shaft is torque-transmittingly connected to the output ring gear by a collared sleeve which is elastically deformable and fixedly attached to the input wheel.

7. The camshaft adjusting system as claimed in claim 2, wherein the coupling is designed as an Oldham coupling.

8. The camshaft adjusting system as claimed in claim 1, wherein the input wheel is supported on the outer camshaft by a radial plain bearing.

9. The camshaft adjusting system as claimed in claim 8, wherein the radial plain bearing is arranged on a radial outer side of a bearing hub and fixedly connected to the outer camshaft.

10. The camshaft adjusting system as claimed in claim 9, wherein the bearing hub is attached to the outer camshaft by a press fit.

11. The camshaft adjusting system as claimed in claim 9, wherein the bearing hub is connected for conjoint rotation to a rotor of the hydraulic camshaft adjuster.

12. The camshaft adjusting system of claim 1, wherein a rotor of the hydraulic camshaft adjuster is configured to be axially moveable with conjoint rotation relative to the outer camshaft.

13. The camshaft adjusting system of claim 12, wherein the rotor is mounted to the outer camshaft by a sliding tooth system.

14. The camshaft adjusting system of claim 13, wherein the rotor is formed with internal teeth and the outer camshaft is formed with external teeth that mesh with the internal teeth.

15. The camshaft adjusting system of claim 14, further comprising a rotor hub attached to the rotor, the rotor hub formed with the internal teeth.

16. The camshaft adjusting system of claim 14, further comprising an intermediate hub attached to the outer camshaft, the intermediate hub formed with the external teeth.

17. A camshaft adjusting system for a camshaft having an inner camshaft and an outer camshaft arranged coaxially with and radially outside the inner camshaft, the camshaft adjusting system comprising:

a hydraulic camshaft adjuster including an input wheel configured to provide torque to the inner and outer camshafts, the hydraulic camshaft adjuster configured to adjust a phase angle of the outer camshaft relative to the input wheel; and an electric camshaft adjuster configured to adjust a phase angle of the inner camshaft; and the electric camshaft adjuster projects into the hydraulic camshaft adjuster at least partially in an axial direction; and a rotor of the hydraulic camshaft adjuster is configured to receive oil from the electric camshaft adjuster.

18. A camshaft adjusting system for a camshaft having an inner camshaft and an outer camshaft arranged coaxially with and radially outside the inner camshaft, the camshaft adjusting system comprising:

a hydraulic camshaft adjuster including an input wheel configured to provide torque to the inner and outer camshafts, the hydraulic camshaft adjuster configured to adjust a phase angle of the outer camshaft relative to the input wheel; and an electric camshaft adjuster configured to adjust a phase angle of the inner camshaft; and the electric camshaft adjuster projects into the hydraulic camshaft adjuster at least partially in an axial direction; and a rotor of the hydraulic camshaft adjuster receives at least a portion of an output ring gear of the electric camshaft adjuster.

19. The camshaft adjusting system of claim 18, wherein the output ring gear is configured to fluidly connect the inner camshaft to working chambers of the hydraulic camshaft adjuster.

* * * * *